(12) United States Patent
Tsirkin

(10) Patent No.: US 12,632,280 B2
(45) Date of Patent: May 19, 2026

(54) CACHING MEMORY MAPPED I/O EMULATION FOR VIRTUAL MACHINES

(71) Applicant: Red Hat, Inc., Raleigh, NC (US)

(72) Inventor: Michael Tsirkin, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 478 days.

(21) Appl. No.: 18/193,032

(22) Filed: Mar. 30, 2023

(65) Prior Publication Data

US 2024/0330032 A1      Oct. 3, 2024

(51) Int. Cl.
*G06F 9/455*      (2018.01)

(52) U.S. Cl.
CPC ................... G06F 9/45558 (2013.01); *G06F 2009/45579* (2013.01); *G06F 2009/45583* (2013.01)

(58) Field of Classification Search
CPC ....... G06F 9/45558; G06F 2009/45579; G06F 2009/45583
See application file for complete search history.

(56) References Cited

U.S. PATENT DOCUMENTS

| | | | |
|---|---|---|---|
| 9,424,199 B2 | 8/2016 | Kegel et al. | |
| 9,753,861 B2 | 9/2017 | Tsirkin et al. | |
| 9,904,567 B2 | 2/2018 | Tsirkin | |
| 10,216,598 B2 | 2/2019 | Haid et al. | |
| 10,268,595 B1 | 4/2019 | Bonzini et al. | |
| 10,768,965 B1 | 9/2020 | Habusha et al. | |
| 10,884,790 B1* | 1/2021 | Saidi | G06F 12/1027 |
| 11,436,112 B1* | 9/2022 | Kumar | G06F 11/2046 |
| 2006/0041710 A1* | 2/2006 | Silva | G06F 9/4411 |
| | | | 711/202 |
| 2017/0286672 A1* | 10/2017 | Sultana | G06F 21/56 |
| 2018/0107607 A1* | 4/2018 | Tsirkin | G06F 12/1027 |
| 2019/0121744 A1* | 4/2019 | Bonzini | G06F 9/45558 |
| 2019/0361728 A1* | 11/2019 | Kumar | H04L 67/34 |
| 2022/0138066 A1* | 5/2022 | Gaur | G11C 29/02 |
| | | | 714/703 |
| 2022/0283946 A1* | 9/2022 | Ng | G06F 12/0238 |
| 2023/0289204 A1* | 9/2023 | Ismael | H04L 63/20 |
| 2023/0298129 A1* | 9/2023 | Puffer | G06F 12/109 |
| | | | 345/520 |

OTHER PUBLICATIONS

Stella Bitchebe, Extending Intel PML for Hardware-Assisted Working Set Size Estimation of VMs, Apr. 16, 2021, ACM (Year: 2021).*

(Continued)

*Primary Examiner* — Dong U Kim
(74) *Attorney, Agent, or Firm* — Womble Bond Dickinson (US) LLP

(57) ABSTRACT

A method includes selecting a guest address of an address space of a virtual machine for optimizing memory mapped input/output (MMIO) emulation and initializing a page modification log associated with the virtual machine as full. The method further includes receiving an access of the guest address by the virtual machine and, in response to receiving the access to the guest address, triggering a page modification log full event, and exiting to a hypervisor of the virtual machine to perform a task associated with the guest address.

20 Claims, 6 Drawing Sheets

(56) References Cited

OTHER PUBLICATIONS

Intel Page Modification Logging, a Hardware Virtualization Feature: Study and Improvement for Virtual Machine Working Set Estimation https://arxiv.org/pdf/2001.09991.pdf.

Intel Page Modification Logging for Lightweight Continuous Checkpointing https://os.itec.kit.edu/downloads/ba_2016_sch%C3%B6tterl-glausch_PML_for_Lightweight_Continuous_Checkpointing.pdf.

Out of Hypervisor (OoH): When Nested Virtualization Becomes Practical https://arxiv.org/pdf/2202.13483.pdf.

* cited by examiner

100

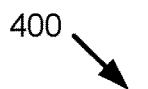

400

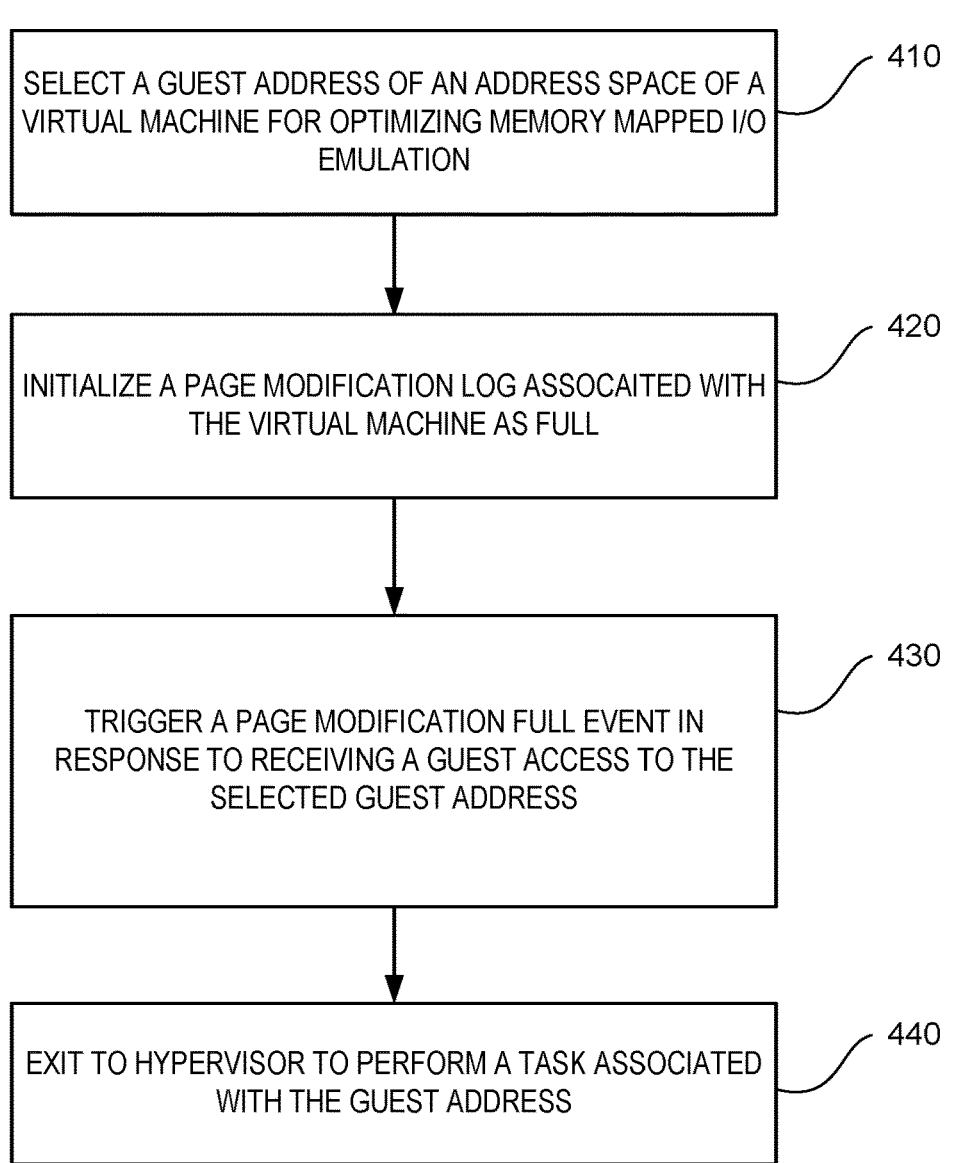

SELECT A GUEST ADDRESS OF AN ADDRESS SPACE OF A VIRTUAL MACHINE FOR OPTIMIZING MEMORY MAPPED I/O EMULATION — 410

INITIALIZE A PAGE MODIFICATION LOG ASSOCAITED WITH THE VIRTUAL MACHINE AS FULL — 420

TRIGGER A PAGE MODIFICATION FULL EVENT IN RESPONSE TO RECEIVING A GUEST ACCESS TO THE SELECTED GUEST ADDRESS — 430

EXIT TO HYPERVISOR TO PERFORM A TASK ASSOCIATED WITH THE GUEST ADDRESS — 440

FIG. 4

CACHING MEMORY MAPPED I/O EMULATION FOR VIRTUAL MACHINES

TECHNICAL FIELD

Aspects of the present disclosure relate to memory mapped input/output (MMIO) emulation in virtual environments, and more particularly, caching MMIO address translations using a page modification log for a virtual machine.

BACKGROUND

A hypervisor abstracts the physical resources of a computing device such as physical processing devices (e.g., processors, CPUs, etc.) and physical memory (e.g., RAM) into virtual resources. The hypervisor manages and assigns the virtual resources to virtual machines (VMs) running on the computing device. A virtual machine (VM) is the virtualization or emulation of a computer system, and may be run on a server. Virtual machines are based on computer architectures and provide functionality of a physical computer. VM implementations may involve specialized hardware, software, or a combination of the two.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a flow diagram of caching address translations in MMIO emulation for virtual machines, in accordance with some embodiments.

DETAILED DESCRIPTION

Figure 1:
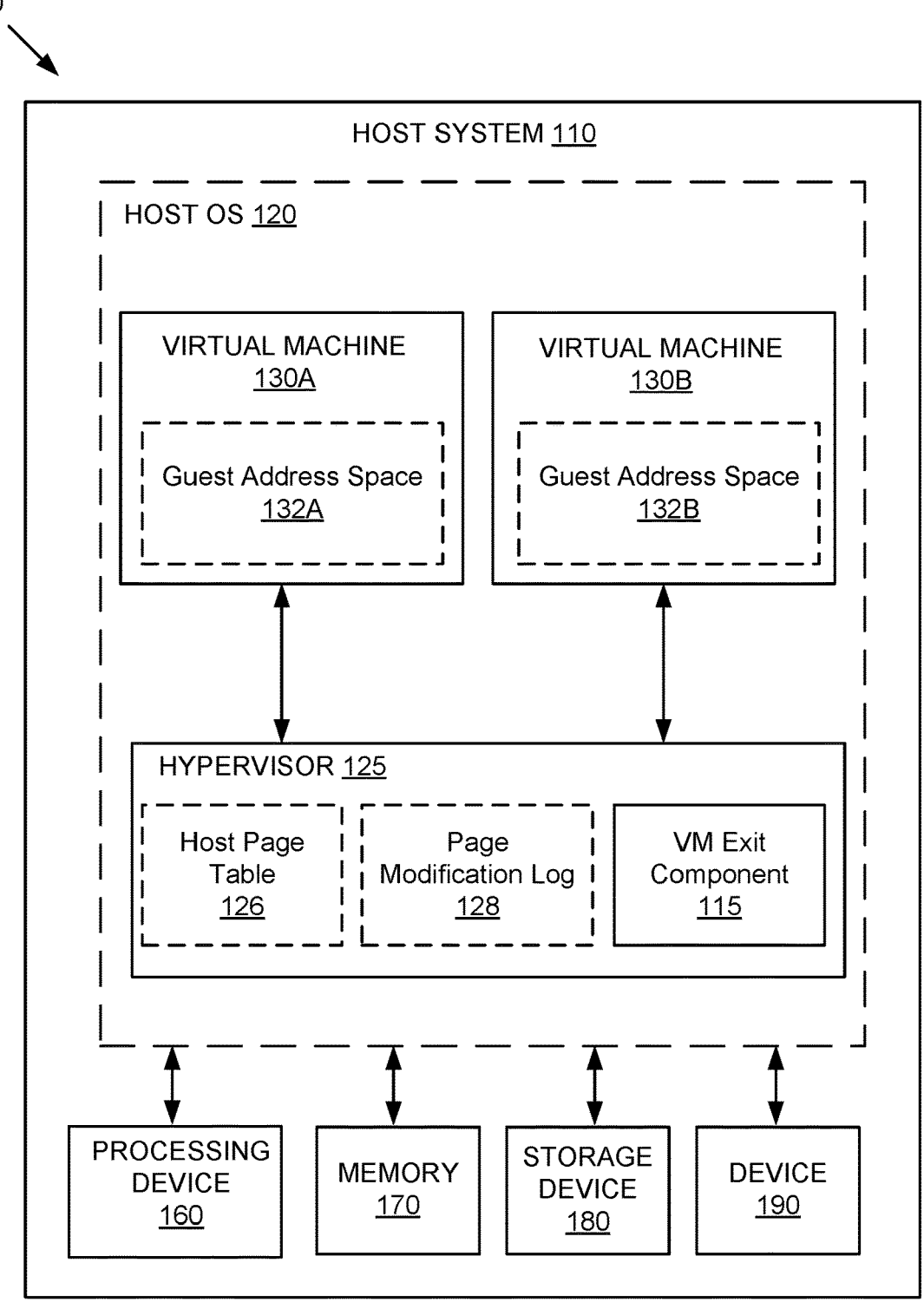
FIG. 1 is a system diagram that illustrates an example computer system architecture for cacheable MMIO emulation for virtual machines, in accordance with some embodiments.

Memory mapped input/output (MMIO) is a method for using the same address space for main memory and memory of an i/o device of a computing system. In the context of virtualized environments, a virtual machine (VM) may emulate an MMIO scheme to signal events or requests to a hypervisor managing the virtual machine. For example, when the virtual machine accesses a specific subset of memory (e.g., MMIO memory) of the guest address space, an event is signaled to the hypervisor. In conventional MMIO emulation, the access of the MMIO memory by the guest virtual machine triggers a page table violation or misconfiguration fault to cause the central processing unit (CPU) to exit to the context of the hypervisor. The hypervisor may then handle the corresponding event. However, when a fault triggers the exit to the hypervisor, the address translation from the guest address space to the host address space is not cached. Therefore, each time the MMIO guest address is accessed an address translation has to reoccur causing significant latency and additional computation costs for the VM exits.

While conventional systems may include VM exit capabilities beyond MMIO emulation, such as a hypercall to the hypervisor, MMIO emulation has several distinct advantages over such methods. In particular, an MMIO exit allows for transparent virtualization because the address can belong to the hypervisor, a physical device, or a virtual device in a nested VM configuration. Additionally, a guest VM can provide specific components within the VM (e.g., applications, VMs, virtual devices, etc.) access to the MMIO address using guest page table entries (PTEs).

Aspects of the disclosure address the above-noted and other deficiencies by providing techniques for caching MMIO emulation address translations. Embodiments may utilize the page modification log capabilities of a processing device to log and cache the address translations upon accessing an MMIO emulated address. For example, a hypervisor may identify at least one guest page address that is used for MMIO emulation to be optimized for address translation caching. In some examples, the hypervisor may select the MMIO guest page address that is accessed most frequently. The hypervisor may mark the selected MMIO guest page address as valid (e.g., by clearing the accessed and dirty bits in the host page table corresponding to that address). The hypervisor may also initialize each of the other host page table entries corresponding to the guest address space of the virtual machine by setting either one or both of the accessed and dirty bits of each of the host page table entries. The hypervisor may further initialize a page modification log as full.

In some examples, when the guest virtual machine accesses the MMIO address, processing logic may determine that the accessed or dirty bits are not set in the host page table entry corresponding to the guest MMIO address and attempt to increment the page modification log. Because the PML is initialized to full, a PML full event will be triggered. The PML full event may log the address translation (e.g., guest address to host address translation) and the processing logic may then cache the address translation in the MMU of the CPU. Accordingly, future accesses to the MMIO addresses for VM exits to the hypervisor may be performed more quickly using the cached address translation. In some examples, the processor executing the virtual machine may perform the address translation and log it in the PML. The hypervisor or host may then retrieve the address translation from the PML. In another example, the guest virtual machine may provide the guest address directly to the hypervisor via para-virtualization. In other examples, where only a single address is being optimized for MMIO emulation, the hypervisor may already be aware of the selected address because only one address will be capable of triggering the corresponding PML full event and exit to hypervisor.

In another example, the hypervisor may initialize the page modification log to the last index or last entry such that one more log may occur before a PML full event is triggered. Therefore, upon access to a first MMIO address, information may be logged in the last PML entry for use by the hypervisor in one or more VM management tasks. Then upon the second guest access to an MMIO address, the PML full event may be triggered, causing the log of the address translations for the MMIO addresses and the exit to the hypervisor. Accordingly, additional information may be passed to the hypervisor at the VM exit.

Embodiments of the present disclosure provide for reduced latency for VM exits while maintaining transparent virtualization of fault based VM exits. The caching of an MMIO address translation reduces latency as well the use of computing resources required to perform a page walk for address translations. Additionally, the dedicated exit reasons for MMIO access exits to the hypervisor provide for various potential optimizations of VM exits by using the PML full event to cache address translations.

FIG. 1 is a system diagram of an example computer system architecture 100 for cacheable MMIO emulation for virtual machines, in accordance with some embodiments of the present disclosure. One skilled in the art will appreciate that other computer system architectures are possible, and that the implementation of a computer system utilizing examples of the invention are not necessarily limited to the specific architecture depicted by FIG. 1.

As shown in FIG. 1, computer system architecture 100 includes host system 110. The host system 110 includes one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing devices 160A. It should be noted that although, for simplicity, host system 110 is depicted as including a single processing device 160, storage device 180, and device 190 in FIG. 1, other embodiments of host systems 110A may include a plurality of processing devices, storage devices, and devices. The host system 110 may be a server, a mainframe, a workstation, a personal computer (PC), a mobile phone, a palm-sized computing device, etc. In embodiments, host system 110 may be a standalone computing device. In some embodiments, host system 110 may be included in a cluster of computing devices. Accordingly, embodiments of the disclosure may utilize any number of host systems. For example, computer system architecture 100 may include a cluster of computing nodes in which host system 110 is included.

Host system 110 may additionally include one or more virtual machines (VMs) 130A-B and host operating system (OS) 120. VMs 130A-B may be a software implementation of a machine that executes programs as though it were an actual physical machine. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130A-B and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host system 110 may be coupled (e.g., may be operatively coupled, communicatively coupled, may communicate data/messages with each other) with one or more client devices via a network. A network may be a public network (e.g., the internet), a private network (e.g., a local area network (LAN) or wide area network (WAN)), or a combination thereof. In one embodiment, a network may include a wired or a wireless infrastructure, which may be provided by one or more wireless communications systems, such as a WiFi™ hotspot connected with the network and/or a wireless carrier system that can be implemented using various data processing equipment, communication towers (e.g., cell towers), etc. The network may carry communications (e.g., data, message, packets, frames, etc.) between the various components of host system 110 and the one or more client devices.

In some examples, the hypervisor 125 may include processing logic (e.g., VM exit component 115) to select an MMIO emulated address of a guest address space 132A-B of a virtual machine 130A-B for VM exit optimization. The VM exit component 115 of the hypervisor 125 may further initialize a host page table entry corresponding to the selected MMIO emulated address host page table entry of a host page table 126 as valid. The VM exit component 115 may further set a valid or accessed bit of the remaining host page table entries of the host page table 126 that correspond to the guest address space 132A-B of the virtual machine 130A-B. The VM exit component 115 may also initialize a page modification log 128 as full. Upon access of the selected MMIO emulated address by the VM 130, the VM exit component 115 may attempt to decrement an index in a page modification log 128. Since the page modification log 128 is initialized as full, the access to the MMIO emulated address will trigger a PML full event. The PML full event will cause an exit to the hypervisor 125 and cache the address translation of the MMIO emulated address. Additionally, the index of the page modification log 128 will not be decremented upon access of the remaining host page table entries (e.g., any address other than the optimized address) of the guest address space 132. Therefore, the VM 130 will only exit to the hypervisor 125 upon access to the MMIO emulated address. Further details regarding the VM exit component 115 will be discussed at FIGS. 2-8 below.

Figure 2:
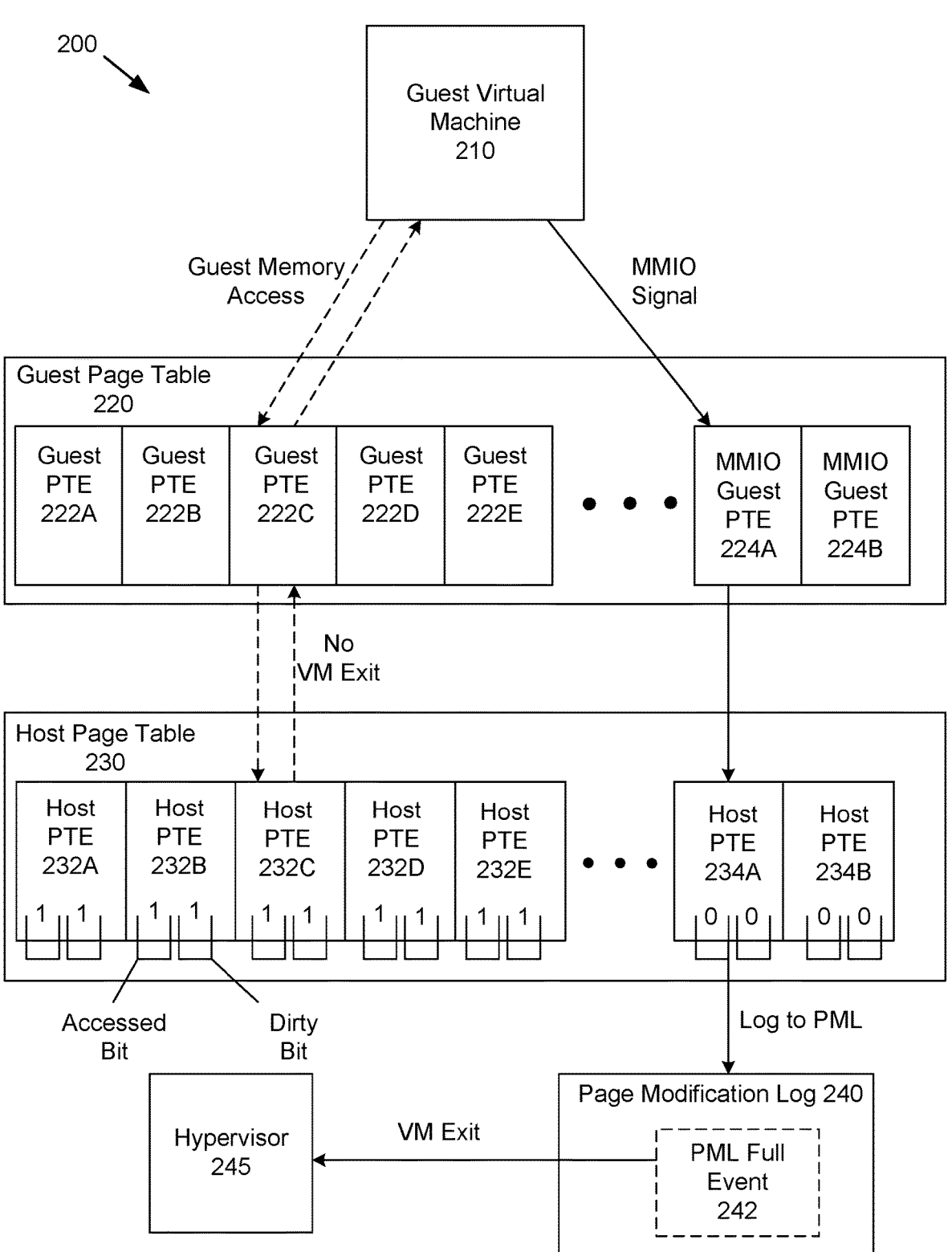
FIG. 2 illustrates an example address space initialization and process flow for cacheable MMIO emulation for virtual machines, in accordance with embodiments of the disclosure.

FIG. 2 depicts an example page table initialization and process flow for cacheable MMIO emulation for virtual machines, in accordance with embodiments of the disclosure. The host page table entries corresponding to guest addresses of a virtual machine may be initialized as provided in host page table 230 of FIG. 2 when a guest virtual machine 210 is in an MMIO optimized mode or setting. The host page table 230 includes multiple host page table entries 232A-E each mapping a guest memory address to a physical memory address as well as host page table entries 234A-B mapping MMIO emulated guest addresses to a physical memory address. Each page table entry 232A-E of the host page table 230 that is mapped to by a guest address space of a virtual machine may be initialized with the dirty and accessed bits set to a Boolean "true" (e.g., "1") while the host page table entries 234A-B mapped by one or more emulated MMIO addresses of the guest virtual machine are set as valid (e.g., valid and dirty bits set to "0"). In addition, a page modification log 240 may be initialized as full or nearly full.

During execution, the guest virtual machine 210 may access guest memory in a virtual guest address space for the guest virtual machine 210. The guest page table 220 may map the guest address space to a host address space via guest page table entries 222A-E. Each guest page table entry 222A-E may map to a host page table entry 232A-E which may in turn map the corresponding host address to a physical memory address. Upon mapping the guest memory access from the guest address space to the host address space using the guest page table entry (e.g., 222C), processing logic may determine whether the accessed host page table entry indicates that the page is dirty, modified, or accessed (e.g., whether the corresponding bit is set to "1"). Upon determining that page has the respective bit or bits set, the processing logic then provides the memory access to the guest virtual machine 210 without a VM exit. When the guest virtual machine 210 accesses the MMIO guest PTE 224A or MMIO guest PTE 224B, the processing logic determines that the respective valid or accessed bits are not set and therefore attempts to log the memory access to a page modification log 240. Because the page modification log 240 has been initialized as full, upon attempting to log the memory access to the page modification log 240, a page modification log full event 242 is triggered. The page modification log full event 242 causes the address translation from the guest address space to the physical address space to be cached (e.g., at a translation lookaside buffer of a memory management unit of a processing device). The page modification log full event 242 may also cause a VM exit to the hypervisor 245. The hypervisor 245 may then perform the event or request corresponding to the MMIO emulated memory access. In some examples, the hypervisor 245 may obtain the guest address and its translation from a PML entry. In another example, the hypervisor 245 may obtain the guest address directly from the guest VM (e.g., via para-virtualization). In other embodiments, the hypervisor 245 may identify the guest address as the only address being used for MMIO emulation optimization.

Figure 3:
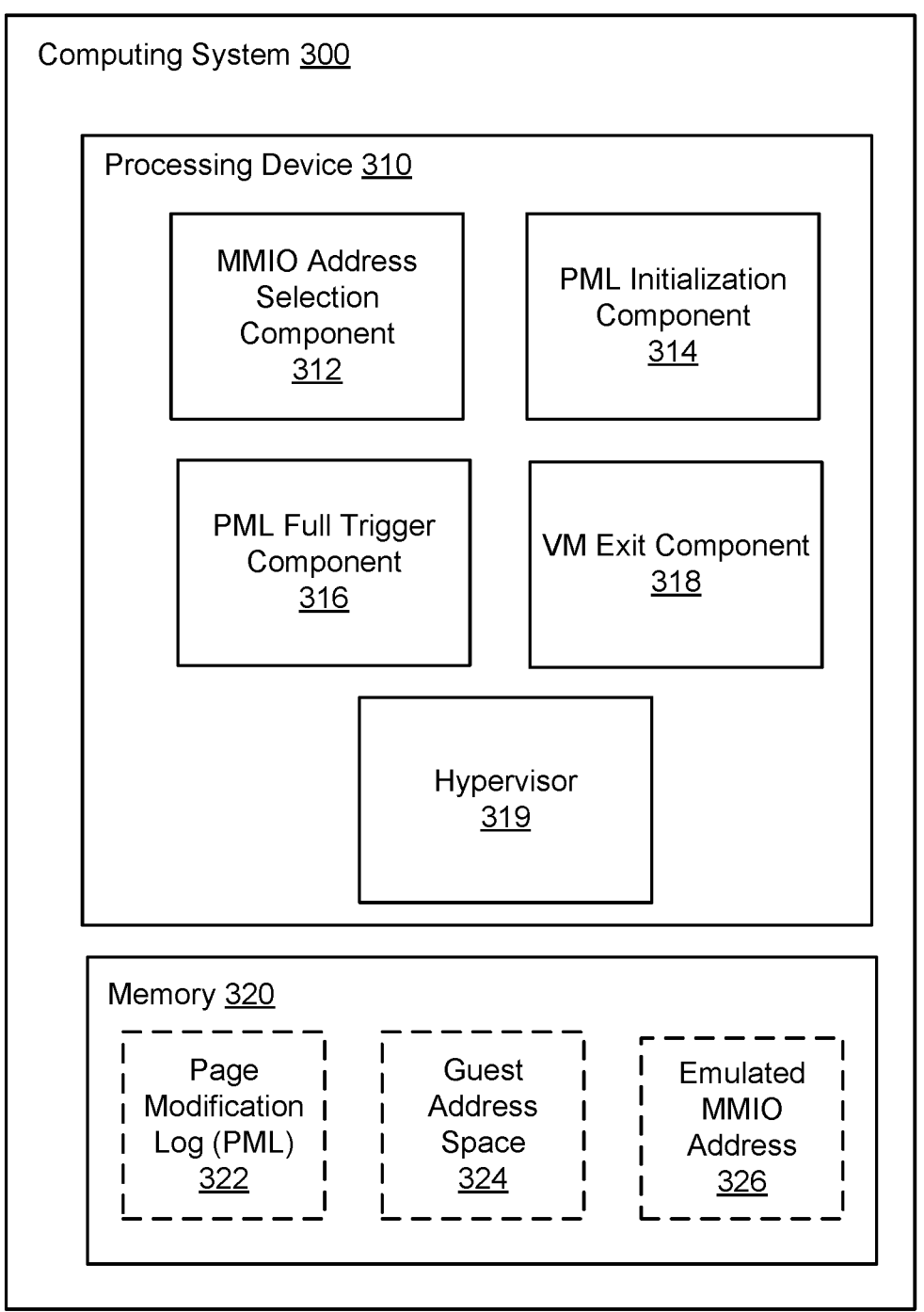
FIG. 3 is a system diagram that illustrates an example computer system providing cacheable MMIO emulation for virtual machines, in accordance with embodiments of the disclosure.

FIG. 3 system diagram that illustrates an example computing system 300 providing cacheable MMIO emulation for virtual machines, in accordance with embodiments of the disclosure. System 300 includes a processing device 310 and a memory 320. Processing device 310 be the same or similar to processing device 160 of FIG. 1 and memory 320 may be the same or similar to memory 170 of FIG. 1. The processing device 310 may execute an MMIO address selection component 312, a PML initialization component 314, a PML full trigger component 316, a VM exit component 318, and a hypervisor 319. In some examples, the memory 320 may include a page modification log 322, a guest address space 324, and one or more emulated MMIO addresses 326.

In some examples, the MMIO address selection component 312 may identify and select one or more MMIO emulated addresses 326 of a guest address space 324 of a virtual machine. For example, the MMIO address selection component 312 may identify the most frequently accessed MMIO emulated address or a number of the most frequently accessed MMIO emulated addresses to be optimized for address translation caching. In some examples, the MMIO address selection component 312 may provide an interface for a user or administrator to select the MMIO emulated address or MMIO functionality to be optimized. The PML initialization component 314 may initialize a PML 322 for a virtual machine as full or nearly full (e.g., only one or two log entries or indexes remaining). For example, the PML initialization component 314 may initialize the index of the PML 322 to a negative value to indicate that it is full. Therefore, the next attempt to log to the PML 322 or decrement the PML index will cause a PML full event. The PML full trigger component 316 may determine that a guest virtual machine has accessed the optimized MMIO emulated address 326 or one of the optimized MMIO emulated addresses and attempt to log the access to the PML 322. Because the PML 322 is set to a negative value, the PML full trigger component 316 may determine that the PML is full and cause an exit from the VM to the hypervisor 319 by the VM exit component 318. The VM exit component 318 may also cache the address translation from the guest address space to the physical memory address in the case of a PML full event. Thus, upon future accesses to the optimized MMIO emulated address, the cached translation may be retrieved rather than performing a page walk of both the guest page table and the host page table for the MMIO emulated address translation. In some examples, firmware of the processing device 310 may be modified to cause the processing device to report the guest page address of the MMIO address to the host (e.g., the hypervisor).

FIG. 4 is a flow diagram of a method 400 of caching address translations in MMIO emulation for virtual machines, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by VM exit component 115 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic selects one or more guest addresses of an address space of a virtual machine for memory mapped i/o emulation. In some examples, the processing logic may select the guest address corresponding to the most used MMIO address to be used as the optimized MMIO address. Selecting the most used MMIO address to be optimized may result in the best overall optimization of VM exits by reducing the address translation time (e.g., required page walks) for the VM exits using that MMIO address.

At block 420, the processing logic initialized a page modification log associated with the virtual machine as full. In some examples, the processing logic may also initialize an accessed or valid bit of the host page table entries associated with the guest address for the MMIO emulation to a first value (e.g., "0") indicating that the pages are valid and have not been accessed or modified. The processing logic may also initialize the accessed or valid bit for all other host page table entries corresponding to the guest VM address space to a second value (e.g., "1") indicating that the host page table entries have been accessed or are dirty (e.g., the bit is set to a Boolean "yes").

At block 430, the processing logic triggers a page modification log full event in response to receiving a guest access to the selected one or more MMIO guest addresses. The page modification log full event may cause the processor (e.g., CPU) to cache an address translation of the MMIO address. For example, the page modification log full event may cause an exit to the hypervisor of the virtual machine and cache an address translation of the MMIO guest address to physical memory. In some examples, the processing logic may cache the address translation at a memory management unit (e.g., in a translation lookaside buffer (TLB)) of a respective processing device executing the VM.

In another example, the processing logic may initialize the page modification log for the virtual machine to the last available index (e.g., the zeroth index) allowing a first guest access to an optimized MMIO address to pass information to the PML. An additional MMIO access will then trigger the PML full event and cause an exit to the hypervisor. Thus, additional information may be passed to the hypervisor via the PML in addition to caching of the MMIO address translation upon the PML full event. In some examples, the processing logic can use paravirtualization to report the guest physical address, and an instruction length of the memory access, to the host (e.g., the hypervisor). For example, the guest virtual machine may send the address and the instruction length directly to the host. In some examples, only a single MMIO address is optimized per vCPU allowing the identification of the accessed MMIO address upon the PML full event. In other examples, the processing logic may modify CPU firmware to report the guest page address and the instruction length in response to a PML log full event.

At block 440, the processing logic exits to the hypervisor to perform the event requested by the virtual machine. For example, each MMIO address may correspond to an event or request to the hypervisor to be performed by the hypervisor on behalf of the virtual machine. Accordingly, the processing logic may identify the corresponding event or request based on the MMIO address accessed by the virtual machine. The hypervisor may then perform the corresponding event that has been identified from the accessed MMIO address.

Because all other PTEs besides the optimized MMIO address have the accessed/dirty bits set at all times during the optimization, memory overcommit and migration solutions that use the accessed/dirty bits may become non-functional. Therefore, in some examples, the processing logic may disable memory overcommit and migration capabilities while the MMIO optimization is active. In another example, the processing logic may use page faults for memory overcommit, where the non-MMIO PTEs are marked as non-present or read-only. Additionally, in some examples, the processing logic may disable the MMIO optimization such as when a migration of a virtual machine is requested.

Figure 5:
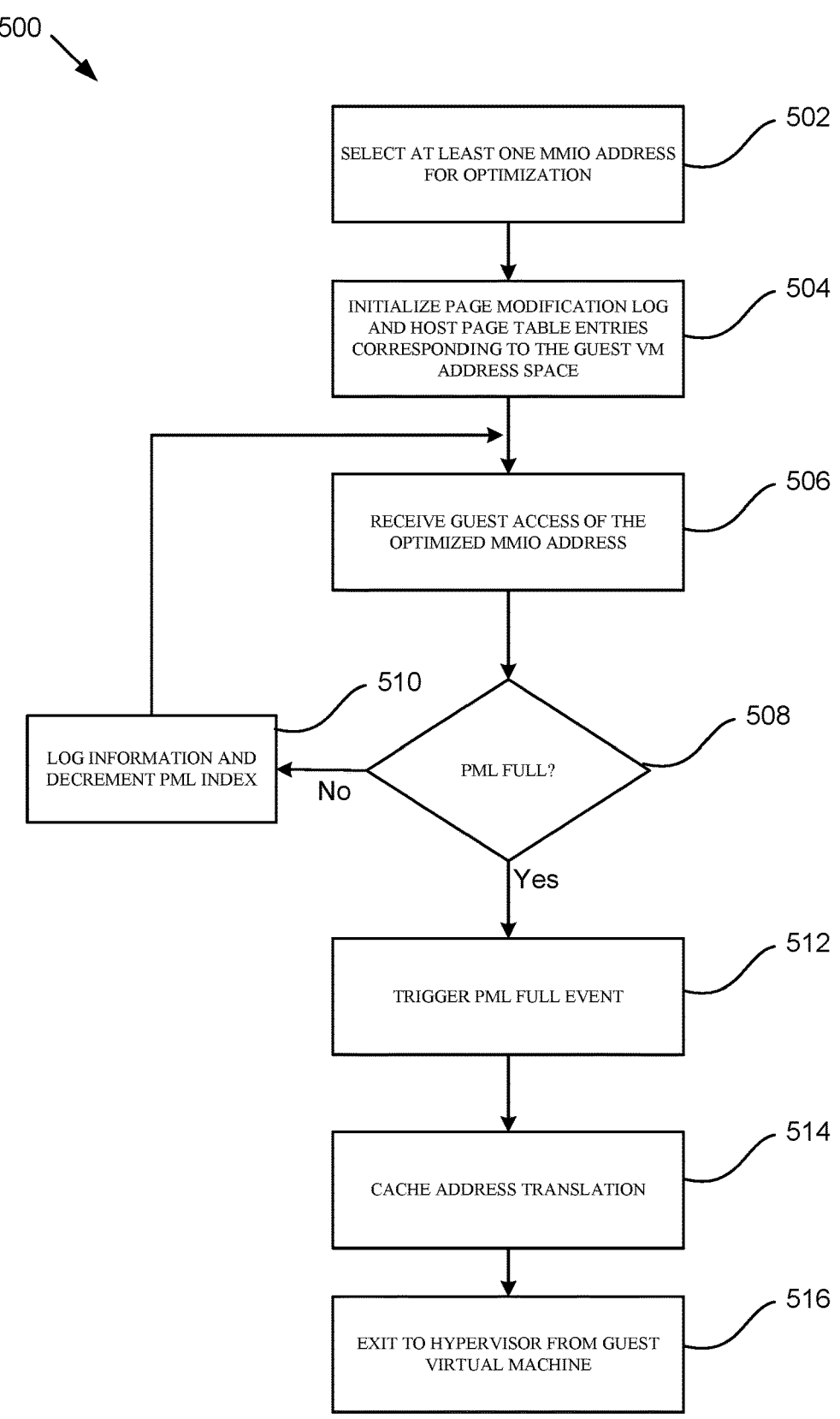
FIG. 5 is a flow diagram of another method of caching address translations in MMIO emulation for virtual machines, in accordance with some embodiments.

FIG. 5 is a flow diagram of a method 500 of caching address translations in MMIO emulation for virtual machines, in accordance with some embodiments. Method

500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a VM exit component 115 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 400. It is appreciated that the blocks in method 500 may be performed in an order different than presented, and that not all of the blocks in method 500 may be performed.

Method 500 begins at block 502, where the processing logic selects at least one MMIO emulated address of a guest virtual machine for optimization. In some examples, an address space of the guest virtual machine may include many MMIO emulated addresses that are accessed by the virtual machine to cause a VM exit to the hypervisor for performance of a particular task. The processing logic may select one of the MMIO emulated addresses to optimize exits to the hypervisor upon access of that address. In some examples, the processing logic may select a particular MMIO emulated address based on the hypervisor task corresponding to the address. In some examples, the processing logic may select an MMIO emulated address that is accessed most frequently by a virtual machine. In another example, the processing logic may receive input (e.g., from a user or administrator) indicating which MMIO emulated address for which to optimized VM exits.

At block 504, the processing logic initialized the page modification log and host page table entries corresponding to the guest VM address space. The processing logic may initialize the host page table entries for the guest address space of the VM to indicate that the pages are dirty or access (e.g., by setting the dirty and valid bits to "1"). The processing logic may initialize only the optimized MMIO emulated address or addresses as valid (e.g., setting the dirty and valid bits to "0"). Upon access to an address in the guest address space, a PML log will not occur because the dirty and accessed bits are set while accesses to the optimized MMIO emulated addresses will cause an attempted log to the PML because the dirty and valid bits are not set. It should be noted that although the dirty and accessed bits are described herein, embodiments of the present disclosure may operate the same or similar by using other PTE bits or an additional dedicated bit.

The processing logic may also initialize the page modification log for the guest VM to either full or nearly full. Initializing the PML to full may include setting an index of the PML to a negative value. Initializing the PML to nearly full may include setting the index of the PML to "0" or otherwise the last index of the PML to allow one entry to the PML without a VM exit and then causing the next attempted entry to trigger a VM exit via a PML log full event.

At block 506, the processing logic receives a guest VM access of the optimized MMIO address. The guest VM may request access to the memory address of the optimized MMIO emulated address in the guest address space. Processing logic may then perform a page walk of the guest page table to identify a translation of the guest address to a host address. The processing logic may then perform an additional page walk on a host page table to identify a page table entry for a translation of the host address to a physical memory address. The processing logic may further determine whether the page table entry of the host page table indicates that dirty, valid, or other specified bit, is set or is not set. If the bit is not set (e.g., the page is indicated as valid), the processing logic then attempts to log the memory access to a page modification log. Because the optimized MMIO emulated addresses are the only addresses set as valid, only accesses to the MMIO emulated addresses will cause a log to the PML.

At block 508, the processing logic determines, in response to receiving the guest access of the optimized MMIO address, whether the PML is indicated as full. For example, the processing logic may determine whether an index of the PML is set to a negative value, indicating that the PML is full. If the PML is full, the processing logic continues to block 512. If the PML is not indicated as full, such as if the PML index is set to 0 (e.g., the last available index), then the processing logic continues to block 510.

At block 510, the processing logic logs information associated with the guest access of the MMIO address and then decrements the PML index. The processing logic may log the request, the accessed memory, and any other information to be passed to a hypervisor for performing one or more tasks.

At block 512, the processing logic triggers a PML full event in response to determining that the PML is indicated as full. The PML full event may indicate that the PML is full and provide the PML log to the host. At block 514, the processing logic caches an address translation for the MMIO address at a memory management unit of a processing device executing the guest VM. For example, the processing logic may cache the guest to physical address translation at a translation lookaside buffer of the memory management unit of the processing device executing the guest VM. The address translation may then be quickly retrieved upon future access to the optimized MMIO emulated address. In some examples, the processing logic also logs the MMIO address and the translation in an entry of the PML.

At block 516, in response to the PML full event, the processing logic exits to the hypervisor of the guest VM to allow the hypervisor to perform the event or request associated with the MMIO address that was accessed by the guest VM. In some examples, the hypervisor may identify the MMIO address from the PML entry. In another example, the guest VM may provide the MMIO address directly to the hypervisor (e.g., via para-virtualization). In other examples, the hypervisor may identify the MMIO address upon a PML full event where the MMIO address is the only address used for MMIO emulation optimization. The MMIO address that is accessed may correspond to a particular task, event, or request to be performed by the hypervisor on behalf of the guest VM. For example, the MMIO address may cause the hypervisor to perform memory management tasks, virtual device management tasks, or any other virtualization management tasks for the guest VM that the guest VM does not have permissions to access or perform.

Figure 6:
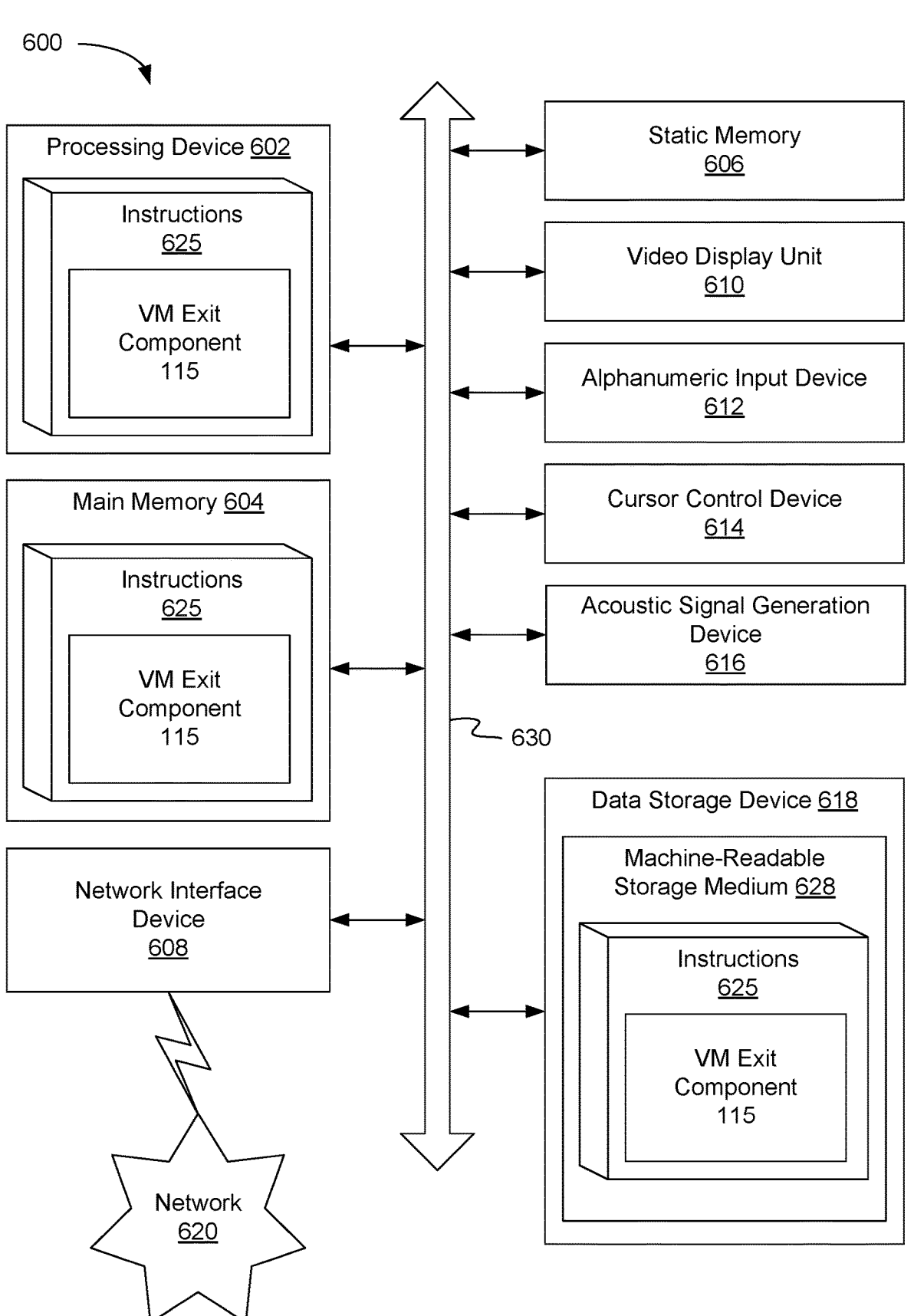
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general-purpose processor, a PLD, etc.) 602, a main memory 604 (e.g., synchronous dynamic random-access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a virtual machine exit component, e.g., VM exit component 115, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

selecting, by a hypervisor, a memory mapped input/output (MMIO) emulated address for optimizing MMIO emulation, the MMIO emulated address comprising a guest address of an address space of a virtual machine;

initializing, by a processing device, a page modification log associated with the virtual machine as full in response to selection of the guest address for optimizing MMIO emulation; and receiving an access of the guest address by the virtual machine; and in response to receiving the access to the guest address:

triggering, by the processing device, a page modification log full event to cause the virtual machine to exit to the hypervisor to perform a task associated with the guest address.

2. The method of claim 1, further comprising:

disabling memory overcommit and migration capabilities of the processing device.

3. The method of claim 1, further comprising:

marking, by the hypervisor, each page table entry associated with non-MMIO emulated addresses of the address space as non-present or read-only; and marking, by the hypervisor, a page table entry associated with the guest address as writeable and non-dirty.

4. The method of claim 1, further comprising:

in response to receiving a migration request for the virtual machine, disabling the MMIO optimization of the guest address.

5. The method of claim 1, further comprising, in response to the page modification log full event, caching an address translation for the guest address.

6. The method of claim 1, further comprising:

translating the page modification log full event to the guest address; and reporting, by the virtual machine, the guest address to the hypervisor.

7. The method of claim 1, further comprising:

selecting a separate guest address for MMIO emulation optimization for each virtual processor associated with the virtual machine.

8. The method of claim 1, further comprising:

modifying firmware associated with the processing device to cause the processing device to report, in response to the page modification log full event, the guest address and an instruction length associated with the access of the guest address to the hypervisor.

9. A system comprising:

a memory; and a processing device operatively coupled to the memory, the processing device to:

select, by a hypervisor, a memory mapped input/output (MMIO) emulated address for optimizing MMIO emulation, the MMIO emulated address comprising a guest address of an address space of a virtual machine;

initialize a page modification log associated with the virtual machine as full in response to selection of the guest address for optimizing MMIO emulation;

receive an access of the guest address by the virtual machine; and in response to receiving the access to the guest address, the processing device is to:

trigger a page modification log full event to cause the virtual machine to exit to the hypervisor to perform a task associated with the guest address.

10. The system of claim 9, wherein the processing device is further to:

disable memory overcommit and migration capabilities associated with the processing device.

11. The system of claim 9, wherein the processing device is further to:

mark, by the hypervisor, each page table entry associated with non-MMIO emulated addresses of the address space as non-present or read-only; and mark, by the hypervisor, a page table entry associated with the guest address as writeable and non-dirty.

12. The system of claim 9, wherein the processing device is further to:

in response to receiving a migration request for the virtual machine, disable the MMIO optimization of the guest address.

13. The system of claim 9, wherein the processing device is further to, in response to the page modification log full event, cache an address translation for the guest address.

14. The system of claim 9, wherein the processing device is further to:

report, by the virtual machine, the guest address to the hypervisor.

15. A non-transitory computer-readable storage medium including instructions that, when executed by a processing device, cause the processing device to:

select, by a hypervisor, a memory mapped input/output (MMIO) emulated address for optimizing MMIO emulation, the MMIO emulated address comprising a guest address of an address space of a virtual machine;

initialize, by the processing device, a page modification log associated with the virtual machine as full in response to selection of the guest address for optimizing MMIQ emulation;

receive an access of the guest address by the virtual machine; and in response to receiving the access to the guest address, cause the processing device to:

trigger, by the processing device, a page modification log full event to cause the virtual machine to exit to the hypervisor to perform a task associated with the guest address.

16. The non-transitory computer-readable storage medium of claim 15, wherein the processing device is further to:

disable memory overcommit and migration capabilities associated with the processing device.

17. The non-transitory computer-readable storage medium of claim 15, wherein the processing device is further to:

mark, by the hypervisor, each page table entry associated with non-MMIO emulated addresses of the address space as non-present or read-only; and mark, by the hypervisor, a page table entry associated with the guest address as writeable and non-dirty.

18. The non-transitory computer-readable storage medium of claim 15, wherein the processing device is further to:

in response to receiving a migration request for the virtual machine, disable the MMIO optimization of the guest address.

19. The non-transitory computer-readable storage medium of claim 15, wherein the processing device is further to, in response to the page modification log full event, cache an address translation for the guest address.

20. The non-transitory computer-readable storage medium of claim 15, wherein the processing device is further to:

report, by the virtual machine, the guest address to the hypervisor.

* * * * *